(12) United States Patent
Munoz Fernandez et al.

(10) Patent No.: US 10,338,299 B2
(45) Date of Patent: Jul. 2, 2019

(54) LIGHTING SYSTEM USING A LIGHTGUIDE

(71) Applicant: SIGNIFY HOLDING B.V., Eindhoven (NL)

(72) Inventors: Fernando Munoz Fernandez, Eindhoven (NL); Johannes Maria Thijssen, Eindhoven (NL)

(73) Assignee: SIGNIFY HOLDING B.V., Eindhoven (NL)

( * ) Notice: Subject to any disclaimer, the term of this patent is extended or adjusted under 35 U.S.C. 154(b) by 0 days.

(21) Appl. No.: 15/562,675

(22) PCT Filed: Mar. 23, 2016

(86) PCT No.: PCT/EP2016/056330
§ 371 (c)(1),
(2) Date: Sep. 28, 2017

(87) PCT Pub. No.: WO2016/156138
PCT Pub. Date: Oct. 6, 2016

(65) Prior Publication Data
US 2018/0095216 A1    Apr. 5, 2018

(30) Foreign Application Priority Data
Mar. 31, 2015   (EP) ..................................... 15161864

(51) Int. Cl.
*F21V 8/00*        (2006.01)
*F21Y 103/30*      (2016.01)
*F21Y 115/10*      (2016.01)

(52) U.S. Cl.
CPC ........ *G02B 6/0048* (2013.01); *F21Y 2103/30* (2016.08); *F21Y 2115/10* (2016.08);
(Continued)

(58) Field of Classification Search
CPC .. G02B 6/0048; G02B 6/0021; G02B 6/0038; G02B 6/0068; G02B 6/0073; F21Y 2103/30; F21Y 2115/10
See application file for complete search history.

(56) References Cited

U.S. PATENT DOCUMENTS

| 8,393,777 B2 | 3/2013 | Minano et al. |
| 2002/0080615 A1* | 6/2002 | Marshall ................... F21V 5/04 362/333 |

(Continued)

FOREIGN PATENT DOCUMENTS

| CN | 1959195 A | 5/2007 |
| CN | 103775849 A | 5/2014 |

(Continued)

*Primary Examiner* — Mary Ellen Bowman

(57) ABSTRACT

A lighting system comprising an array of LEDs, collimators for collimating the light output from the LEDs and a lightguide mounted over the array of collimators. The lightguide comprises an elongate structure having a length direction with one light input end mounted over the collimators, wherein the general shape in cross section perpendicular to the length direction comprises a non-circular arc. The array of LEDs is mounted following a corresponding non-circular arc. Light extraction features are provided for out-coupling light from an outer arcuate surface of the lightguide. The non-circular arc formed by the outer surface of lightguide enables a non-uniform light output distribution to be formed. The shape of the surface can thus be used to control the directional light output.

15 Claims, 9 Drawing Sheets

(52) U.S. Cl.
CPC .......... *G02B 6/0021* (2013.01); *G02B 6/0038* (2013.01); *G02B 6/0068* (2013.01); *G02B 6/0073* (2013.01)

(56) References Cited

U.S. PATENT DOCUMENTS

| | | |
|---|---|---|
| 2007/0189701 A1 | 8/2007 | Chakmakjian et al. |
| 2010/0208490 A1* | 8/2010 | Tsuchiya ................ G02B 6/003 362/606 |
| 2010/0315811 A1 | 12/2010 | Chen et al. |
| 2010/0321952 A1* | 12/2010 | Coleman .................. F21S 8/04 362/607 |
| 2013/0201717 A1 | 8/2013 | Holman |
| 2014/0140091 A1 | 5/2014 | Vasylyev |

FOREIGN PATENT DOCUMENTS

| | | |
|---|---|---|
| EP | 2161599 A1 | 3/2010 |
| WO | 2009130653 A1 | 10/2009 |

* cited by examiner $$\alpha = \pi/2 - (\pi/2 - \alpha_c - \beta) - (\pi/2 - \beta)$$
$$= \alpha_c + 2\beta - \pi/2$$

$$\beta = \pi/2 - \alpha - \alpha_c$$
$$= (\pi - 2\alpha_c)/3$$

$$\alpha = \alpha_c + 2(\pi - 2\alpha_c)/3 - \pi/2$$

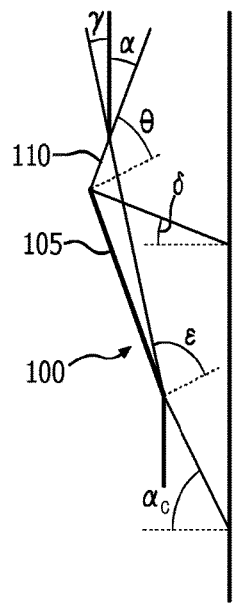
FIG. 11
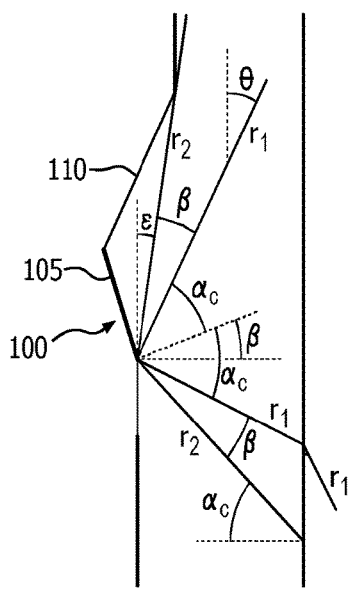   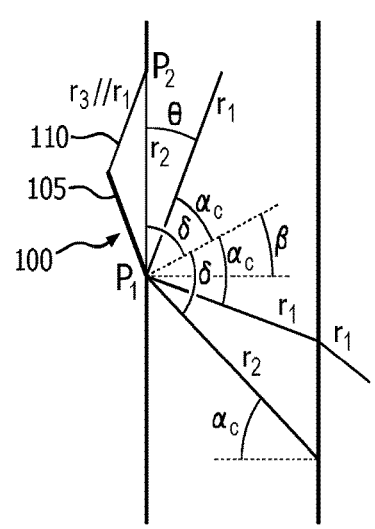
FIG. 12     FIG. 13

LIGHTING SYSTEM USING A LIGHTGUIDE

CROSS-REFERENCE TO PRIOR APPLICATIONS

This application is the U.S. National Phase application under 35 U.S.C. § 371 of International Application No. PCT/EP2016/056330, filed on Mar. 23, 2016 which claims the benefit of European Patent Application No. 15161864.2, filed on Mar. 31, 2015. These applications are hereby incorporated by reference herein.

FIELD OF THE INVENTION

This invention relates to a lighting system which uses a lightguide to define the light output.

BACKGROUND OF THE INVENTION

A lightguide (otherwise known as a waveguide) traps light by providing total internal reflection with the lightguide. This is achieved by controlling the angles over which light enters the lightguide as well as selection of a material with suitable refractive index, which must be higher than the refractive index of the surrounding material, typically air.

Edge lit lightguides for back lighting and front lighting of displays are well known, and they are inexpensive and robust.

Known edge lit lightguides are designed to provide maximum uniformity of light output across the entire surface of the lightguide.

FIG. 1 shows a schematic image of an edge lit lightguide 10. The lightguide comprises a waveguide material, such as a slab of solid material with a top face 10a, a bottom face 10b and lateral edges 10c. There are top and bottom edges which cannot be seen in FIG. 1, as the cross section of FIG. 1 is taken in the lateral side-to-side direction. The lightguide is generally rectangular in plan view.

From the left side in FIG. 1, light is coupled in from a light source 12 and at the bottom of the lightguide several light out-coupling (i.e. light extraction) structures 14 (are placed. Light propagates under an angle $\theta_{in}$ inside the lightguide with height H. The out-coupling structures 14 in this example are drawn as half prisms with a half top angle $\alpha$, height h, and a width w.

The lightguide is formed as a dielectric slab made out of e.g. glass or polycarbonate. In the slab, total internal reflection at the borders keeps the light confined while the light propagates. The edges of the slab are typically used to couple in light and the small light out-coupling structures 14 locally couple light out of the lightguide. The light extraction is achieved when the light hits a surface with scattering properties, or else the light hits a surface that breaks the parallelism that allowed the light to be reflected with angles larger than the critical angle.

In addition to LCD backlighting, lightguides are now also being used in office luminaires as well as in outdoor lighting. These new applications have also meant a departure from the flat slab based lightguides used in display applications.

For example, a cylindrical lightguide has been proposed in EP 2161599, in which light is emitted from a top annular surface of the cylinder. A lampshade with a tapered lightguide has been proposed in US 20130201717, in which the lampshade has a substantially cylindrical shape (that may be elliptic, parabolic or hyperbolic) with light extraction features applied to the inner surface.

Making an asymmetric light distribution (for example a lateral distribution Type III according to the classification of the Illuminating Engineering Society of North America (IESNA)) is a challenge using lightguides. Architectures using a circular cylindrical lightguide create rotationally symmetric patterns on a plane perpendicular to the lightguide. Due to the symmetry of the system, rays contained in the meridian planes (those containing the optical/symmetry axis) are controlled by the two-dimensional shape profile of the guide. The other non-meridian rays will also contribute to the rotationally symmetric pattern, although they are not controlled by the design.

In order to create an asymmetric light distribution with a circular cylindrical lightguide, it is possible to change the LED arrangement, in particular concentrating LEDs in some zones and/or diluting the density of the LEDs in other ones. Alternatively, the asymmetry may be achieved by dimming of some LEDs. This latter approach obviously limits the luminous flux that can be generated, because some LEDs are switched off or dimmed. There is also a disadvantage that this results in a very non-uniform appearance to the lightguide, which is not preferred in many applications.

SUMMARY OF THE INVENTION

The invention is defined by the claims.

According to an example, there is provided a lighting system, comprising:
an array of LEDs;
a collimator arrangement mounted over the array of LEDs for collimating the light output from the LEDs;
a lightguide mounted over the collimator arrangement, the lightguide comprising:
an elongate structure having a length direction with one light input end mounted over the collimator arrangement, wherein the general shape in cross section perpendicular to the length direction comprises a non-circular arc, and the array of LEDs follows a corresponding non-circular arc; and
light extraction features extending widthwise parallel to the light input end for out-coupling light from an outer arcuate surface of the lightguide,
wherein an angle $\beta$ is the angle between the normal n of the light extraction feature and the length direction, wherein said angle $\beta$ at least once is gradually or abruptly changed in a direction parallel to the light input.

The non-circular arc formed by the outer surface of lightguide enables a non-uniform light output distribution to be formed. The light output may for example be centered around a direction normal to the local part of the surface. The shape of the surface can thus be used to control the directional light output. The tilt angle $\beta$ may change abruptly, gradually or according to any rule over the cross section of the arcuate surface, said change in tilt angle $\beta$ enables to further tune the light output distribution and/or to improve the uniformity of the illuminance on the ground.

The non-circular arc may define a closed shape, or it may define an open shape, i.e. a portion of a closed curved shape such as an ellipse.

An asymmetric light distribution may be generated which satisfies Type II, III or IV according to the IESNA classification, while maintaining a low level of uplighting (if the lightguide is mounted vertically with the light input end at the top) for example less than 4% up-lighting, an acceptable amount of backlight (i.e. light emitted through the inner surface of the lightguide, for example less than 25%) and sufficient light within a small geometry. The light intensity may for example be of the order of 10,000 lm within a diameter of 100 mm.

By customizing the shape of the lightguide, the light is redirected towards appropriate directions in order to create a desired photometric pattern.

The LEDs may be provided on a carrier such as a printed circuit board.

The light extraction features are preferably provided at an inner arcuate surface of the lightguide. They change the direction of the light so that it may then escape from the outer surface. In this way, the outer surface can have a desired e.g. smooth outer appearance.

The light extraction features may for example comprise over the cross section of the arcuate surface one continuous sloped facet or a number of discrete sloped facets. These are used to interrupt total internal reflection within the lightguide. The extraction features at the inner surface change the direction of the light reflected on them and so that the total internal reflection condition is lost when they arrive at the outer surface so they escape from the lightguide. The facets then preferably extend widthwise parallel to the plane of the light input end. Each facet is then a fixed (shortest) distance from the light input end.

In an embodiment of the system, the lightguide comprises in the direction parallel to the light input end a plurality of sections positioned side to side, and wherein β is the same within a respective section, but for at least two sections β is mutually different. The transition between each part of the guide can be sharp (for example by joining extruded sections together) or smooth (for example by molding the combined design). The transition extends over a small or large angle (a large angle giving a more gradual transition from one cross-section to the next). This is one of the design parameters for the device and can be used to further improve uniformity of the illuminance on the ground and to further tune the width of the light distribution.

The lightguide may have the same cross sectional shape in a plane parallel to the length direction and parallel to the normal direction to the outer surface. This plane is through the thickness direction of the lightguide. By having a same cross sectional shape, the lightguide has a uniform appearance. It also gives the possibility that the lightguide may be formed as an extruded component. It may be extruded as a flat sheet which is then bent into the desired arcuate shape, for example this may be suitable for a silicone lightguide. This approach is also possible for a PMMA lightguide, by performing the bending while the material is warm (close to the glass transition temperature). This approach may reduce the investment/manufacturing cost compared to a molding process, but it is more labor intensive.

Instead of being a single sheet, the lightguide may comprise a plurality of sections, wherein each section covering the full length and being positioned side to side, and wherein each section has the same cross sectional shape in a plane parallel to the length direction and parallel to the normal direction to the outer surface.

In an embodiment of the system the plurality of sections comprises outer sections and a central section, wherein the outer sections equidistantly arranged from the central section on either side thereof, are mirrorly arranged and their respective light extraction feature has the same angle β. This can, for example, be used to easily set and improve a desired symmetry of the light distribution.

The sections may be molded as a single component with a smooth transition between the different sections, to maintain a desired aesthetic appearance.

In one example, the collimator arrangement comprises total internal reflection collimators having a lens portion and a reflector portion. These collimators may be rotationally symmetric.

In another example, the lightguide may comprise a channel which defines a lens surface of the collimator arrangement at a base of the channel. The collimator arrangement may further comprise a reflector portion forming a total internal reflection surface.

By forming the collimator arrangement as an elongate one dimensional channel structure, the LEDs can be positioned at any desired positions along the channel. This makes the lightguide suitable for use with different LED arrangements.

The lightguide may have a decreasing thickness away from the light input end, with step decreases in thickness defined by the light extraction features. The light extraction features then comprise facets which step progressively from a thick top to a thin base.

The lightguide may instead have a constant thickness excluding the light extraction features, and the light extraction features comprise raised or sunken projections.

The LEDs may be arranged uniformly along their non-circular arc, but they may also be arranged non-uniformly to alter the light output characteristics.

The overall system preferably has an asymmetric angular light output intensity distribution in a plane perpendicular to the length direction.

BRIEF DESCRIPTION OF THE FIGURES

Embodiments of the invention will now be described, purely by way of example, with reference to the accompanying drawings, in which:

FIG. 11 shows a second example of a single light extraction feature to show the light paths;

FIG. 12 shows a third example of a single light extraction feature to show the light paths;

FIG. 13 shows a fourth example of a single light extraction feature to show the light paths.

DETAILED DESCRIPTION OF THE EMBODIMENTS

The invention provides a lighting system comprising an array of LEDs, collimators for collimating the light output from the LEDs and a lightguide mounted over the array of collimators. The lightguide comprises an elongate structure having a length direction with one light input end mounted over the array of collimators, wherein the general shape in cross section perpendicular to the length direction comprises a non-circular arc, and the array of LEDs follows a corresponding non-circular arc. Light extraction features are provided for out-coupling light from an outer arcuate surface of the lightguide. The non-circular arc formed by the outer surface of lightguide enables a non-uniform light output distribution to be formed. The shape of the surface can thus be used to control the directional light output.

Figure 2:
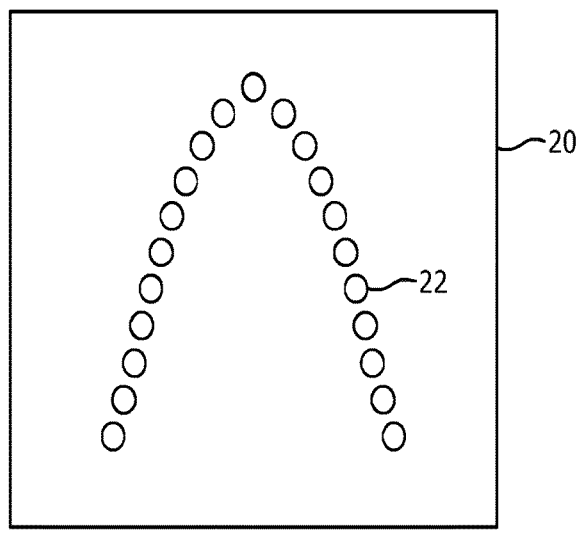
FIG. 2 shows a first light emitting part of a lighting system.

A first part of the system shown in FIG. 2 comprises a carrier 20 such as a printed circuit board and an array of LEDs 22 mounted on the carrier. The LEDs follow a non-circular arc. Note that the LEDs may instead be discrete LED components.

There may be a single line of LEDs as shown, but there may also be multiple lines of LEDs around the general non-circular arc shape.

In one envisaged application of the system, the carrier comprises a PCB which is for mounting horizontally, with the LEDs placed facing downwards. This is the desired arrangement for a luminaire mounted above the ground, for projecting light downwardly and laterally towards the ground, for example a street light.

Figure 3:
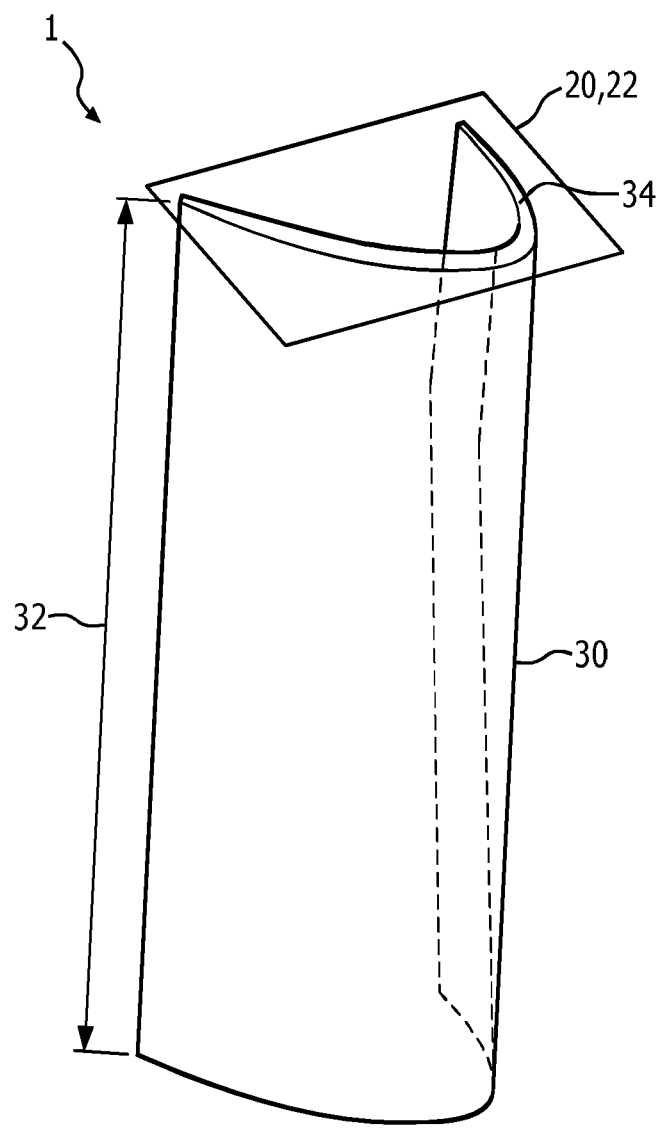
FIG. 3 shows a first example of the complete lighting system.

As shown in FIG. 3, in the lighting system 1 a lightguide 30 is mounted over the LED PCB 20, therefore projecting vertically downwards in some examples.

The lightguide comprises an elongate structure having a length direction 32 with one light input end mounted over the LED PCB 20. The general shape in cross section perpendicular to the length direction (i.e. parallel to the PCB plane) comprises a non-circular arc. The shape of the arrangement of the LEDs on the PCB matches the shape of the lightguide and light from the LEDs is coupled into the lightguide at the light input end 34. The number of LEDs will depend on the required light flux and type of LEDs used. The spacing between LEDs may be essentially uniform, although the distances between them could vary.

There is collimation of the light emitted by the LEDs before it enters the lightguide. For this purpose, light in-coupling elements are used, for example based on collimators which collect the light from the LEDs (mainly with a Lambertian distribution) and transform the beam into another one that matches the acceptance angle of light extraction features of the lightguide (discussed below). The collimators are for example total internal reflector (TIR) collimators and comprise a central lens and a lateral TIR surface.

Figure 4:
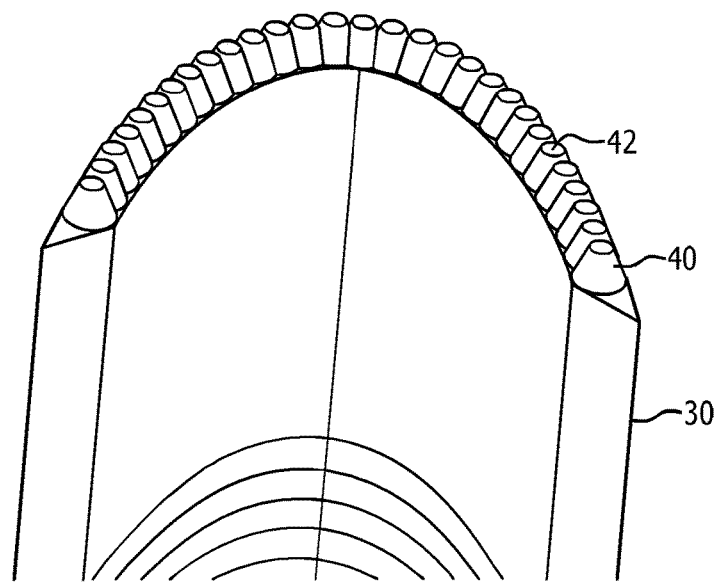
FIG. 4 shows a first example of collimator design.
Figure 4:
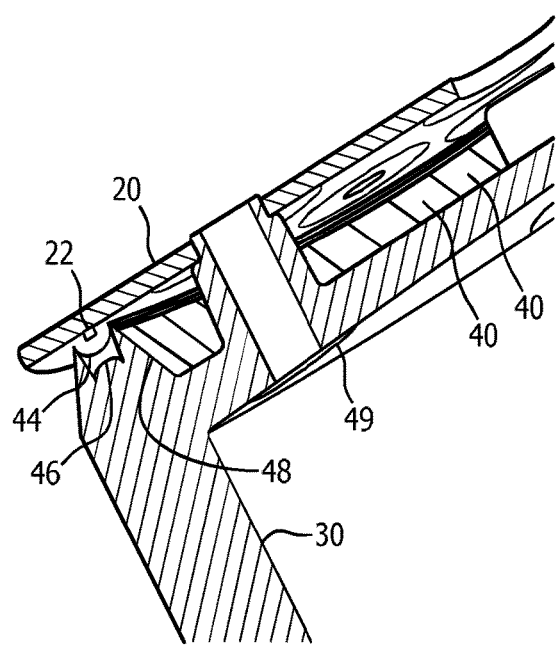

FIG. 4 shows an example in which the collimators comprise individual collimators for each LED or for respective cluster of LEDs. The collimators may be rotationally symmetric, elliptical, or square for example.

FIG. 4 shows a single row of collimators 40 at the top face of the lightguide. The top image shows the lightguide part, and the bottom image shows the LED PCB 20 mounted over the lightguide. Each collimator has a light entry opening 42 at the top, into which a corresponding LED projects. The LED for example includes a lens 44 over the surface of the LED. This lens projects into the opening. The collimator defines a further lens 46 downstream of the light output lens of the LED, and it also defines a tapered side wall 48 at which total internal reflection takes place. The two refractive lenses in combination with the total internal reflection surface perform the collimation function.

FIG. 4 shows that the lightguide has a connection web 49 which enables a connection to be formed between the PCB 20 and the lightguide 30.

The collimators shown in FIG. 4 may be molded with the lightguide 30 as one integral part. This may for example be molded from PMMA, although other plastics such as polycarbonate may be used. The design of FIG. 4 cannot be extruded as a result of the rotational design of the individual collimators.

Depending the density of LEDs the beam output shaping part (the reflecting surfaces 48) of the collimators may overlap.

Figure 5:
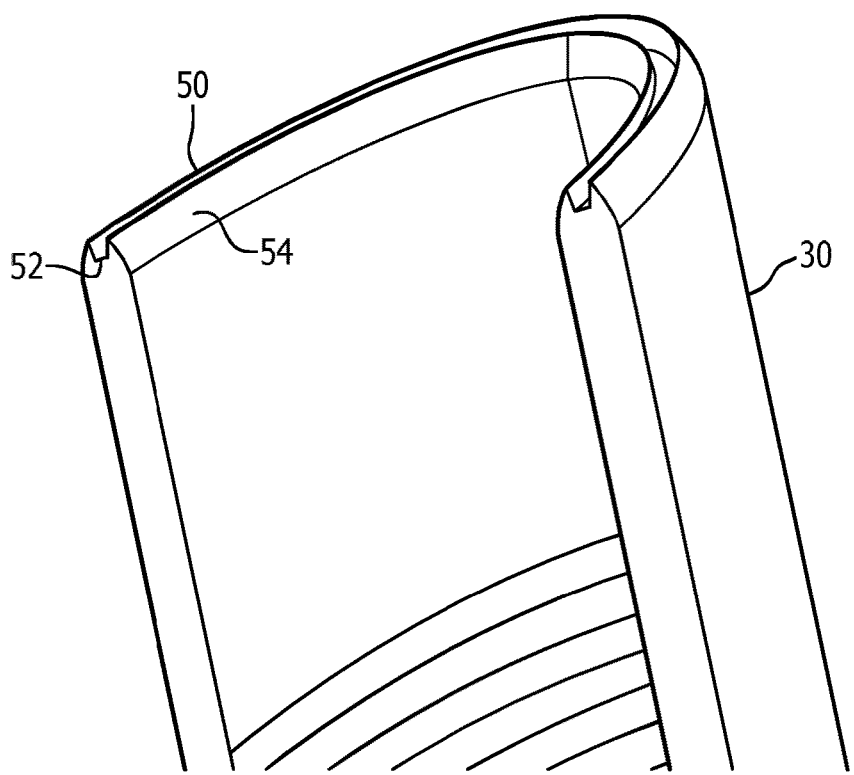
FIG. 5 shows a second example of collimator design.

FIG. 5 shows how the collimators may be formed as translationally extruded structures formed at the top end of the lightguide as part of the extrusion process. In this way, a shared elongate collimator structure is formed which is shared between all of the LEDs.

FIG. 5 shows a channel 50, which has an elongate lens 52 at the base. The channel has sloped side walls which function as total internal reflection surfaces. The features in the design of FIG. 5 function the same way as the features in the design of FIG. 4, and the LED with their output lenses are aligned with and facing into the channel 50. This design can be extruded, although it may equally be molded as a single component.

Using translational collimators (whether extruded or molded) as in FIG. 5 allows flexibility in the number of LEDs and their arrangement along the arc shape. Using individual collimators as in FIG. 4 means the LED array and the lightguide must be made to a corresponding design but it enables more collimated light and therefore more control over the intensity distribution and reduction of backlight and the amount of glare.

The exit face of the collimators (in both cases) is for example flat and coplanar with the light input end 34 of the lightguide.

Figure 1:
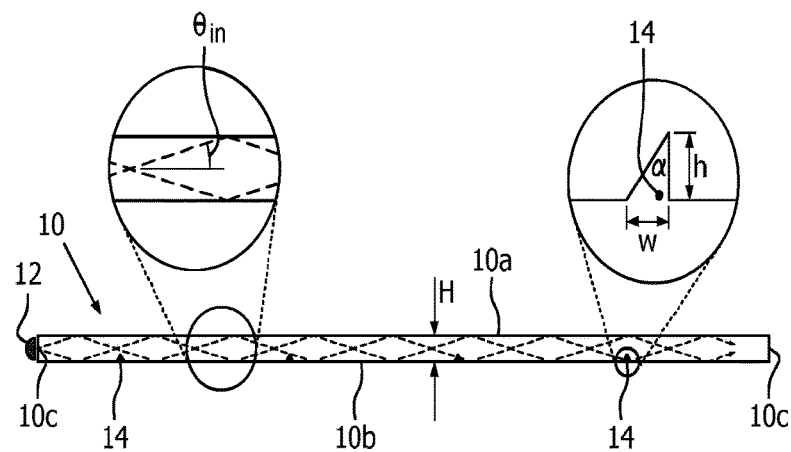
FIG. 1 shows a known backlight design using an edge-lit lightguide.

The lightguide 30 traps light by total internal reflection, but it has light extraction features for out-coupling light from an outer arcuate surface of the lightguide. These light extraction features in one example comprise reflecting facets which function in the same as for the known lightguide of FIG. 1.

The light extraction features are designed to extract the maximum possible amount of light using a reflection from facets in the back surface (i.e. the inside of the arc) whereas the outside of the arc has a smooth outer appearance.

In some examples, the lightguide may be in the form of an extruded 2D profile that is translationally extruded. This 2D profile is a cross sectional shape in a plane parallel to the length direction 32 and parallel to the normal direction to the outer surface. In other words, it is the shape of the thickness of the lightguide wall. This shape will be constant all around the curve for an extruded version. The lightguide wall forms a curve as viewed from above or below, corresponding to the curve on which the LEDs are mounted as shown in FIG. 2.

The lightguide wall can generally follow any curve (not especially a planar curve, it can for example be modulated in the direction perpendicular to a plane). In one example, the curve is elliptical.

The shape of the lightguide allows the light to be redirected towards the appropriate directions in order to create a desired photometric pattern.

Figures 6, 7:
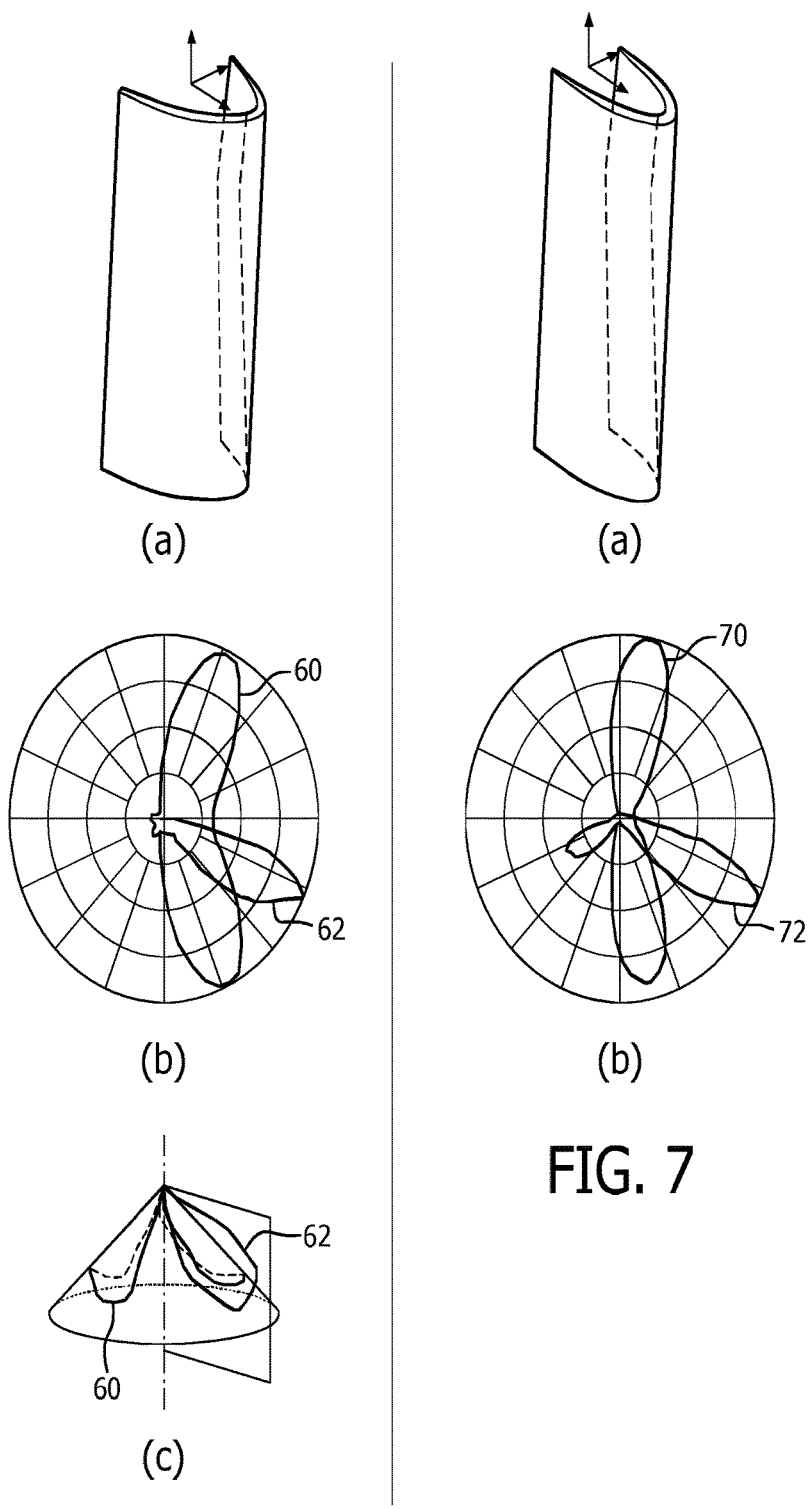
FIG. 6 shows a first example of curved shape of the lighting system and the corresponding optical output.
FIG. 7 shows a second example of curved shape of the lighting system and the corresponding optical output.

FIGS. 6 and 7 show that when the shape is modified, the intensity pattern changes, for the same design of light extraction features and collimators.

FIG. 6(a) shows a first curved design and FIG. 6(b) shows a corresponding angular light output intensity distribution.

Plot 60 shows the intensity distribution on a cone whose axis is the same as the optical axis (i.e. the z-axis). Plot 62 shows the intensity distribution in a plane that contains the optical axis and thus shows the outward intensity function for one emission angle. These are shown schematically in FIG. 6(c).

FIG. 7(a) shows a second curved design with tighter radius of curvature at the bend and FIG. 7(b) shows the corresponding angular light output intensity distribution, using the same plots 70, 72 as in FIG. 6.

FIGS. 6 and 7 relate to designs with the same cross sectional shape, the same extraction feature profiles and the same collimators. It shows that the overall curved shape may be used to define the light output characteristics.

Figure 8:
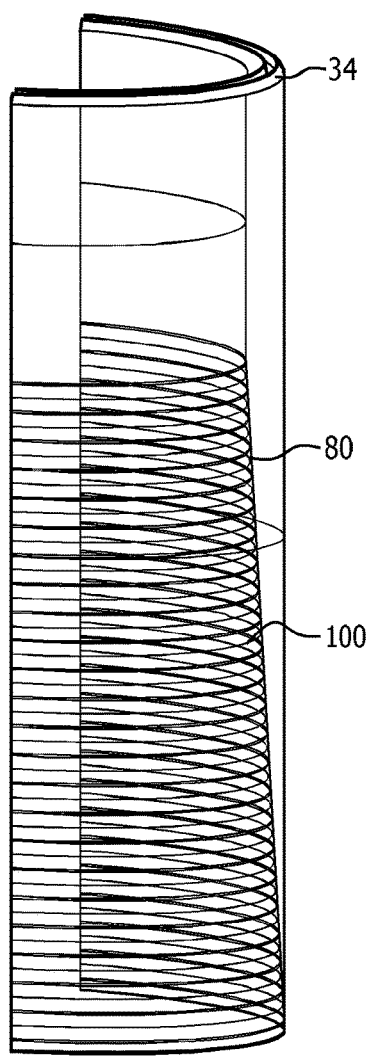
FIG. 8 shows the light extraction features more clearly for an example lighting system using the collimator design of FIG. 5.

FIG. 8 shows a translationally extruded lightguide formed to follow an elliptical curve. Translationally extruded collimators are used.

The cross sectional shape of the thickness of the lightguide sheet has a stepped profile 80, with a decreasing thickness away from the light input end 34, with step decreases in thickness defined by the light extraction features.

Figure 9:
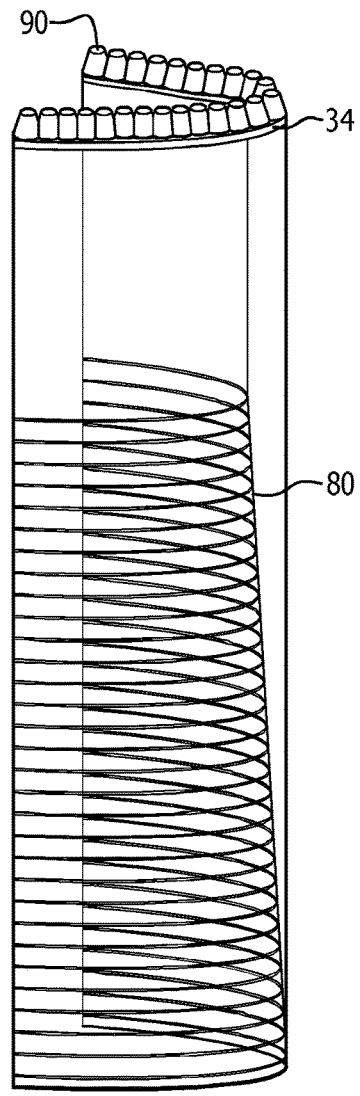
FIG. 9 shows the light extraction features more clearly for an example lighting system using the collimator design of FIG. 4.

FIG. 9 shows a translationally extruded lightguide formed to follow an elliptical curve. Rotationally symmetric collimators are used, and these form part of a cap 90 applied over the top of the lightguide.

As mentioned above, the 2D cross sectional profile is designed to extract the maximum amount of light.

Figure 10:
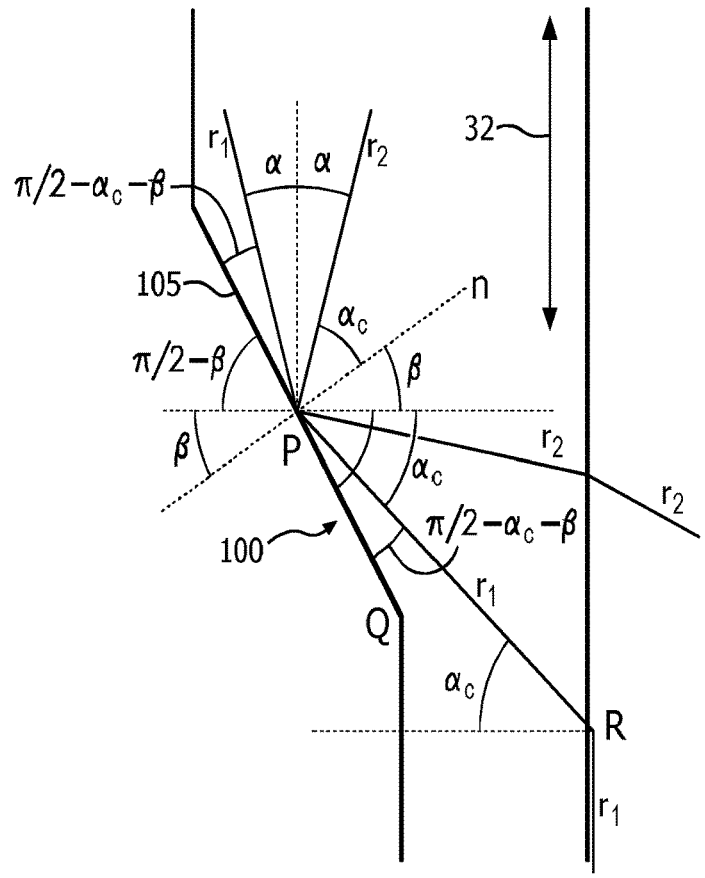
FIG. 10 shows the a first example of a single light extraction feature to show the light paths.

FIG. 10 shows a light extraction feature 100 in the form of a facet 105 which defines a sloped step decrease in the thickness of the lightguide in the cross section. The lightguide has a series of these steps, each step at a different height, i.e. a different distance from the top light input end 34.

The steps may be equally spaced or there may be variations in the gap between the steps down the 2D profiles. FIGS. 8 and 9 also show a design in which an uppermost portion has no or fewer light extraction features. By selecting the gap sizes the overall length of the lightguide can be designed.

As a result of the constant cross section, the facets extend fully around the arc shape at their respective height (the length direction 32 being a vertical height direction). FIG. 10 shows the cross section as defined above, with the length direction 32 and the tangent to the curvature being in a vertical plane which is into and out of the page. This may be considered to be a vertical tangent plane when the length direction 32 is vertical.

The stepped face defines the back inner face (i.e. at the inside of the arc shaped curve) of the lightguide and the smooth face defines the outer visible face which functions as the light output area. Light extraction through the front face is only possible if light hitting it is confined to ±αC relative to its normal, where αC is the critical angle inside the material.

FIG. 10 shows the various angles involved, in which light enters the lightguide from the top light input end with a collimation giving a maximum angular spread in the plane of the cross section of α each side of the downward direction (parallel to the length direction 32). To use the maximum of this angular extent, edge ray r1 should hit the front face at the critical angle αC at point R. This ray was traveling with an angle α to the vertical inside the material before reflection on the facet 100 at point P.

Edge ray r2 also makes an angle α to the vertical before reflection at P. The maximum value for α is such that it hits point P at the critical angle to n (the normal to the facet 100).

There are, therefore, two conditions:

Ray r1 must hit point R with the critical angle (maximum extraction through the front face).

Ray r2 must hit point P with the critical angle (maximum angular aperture α for the light in the lightguide).

There are two angles to be determined as part of the design process:

Angle β for the normal n to the reflection facet 100.

Angle α for the angular extent of the radiation inside the material.

The aim of the overall design is to create an asymmetric light output pattern (as shown in FIG. 6(b)).

The 2D profile is designed according to the design rules which follow from the analysis shown in FIG. 10. This 2D profile is translationally extruded along a non-circular path, and the normal vectors for that non-circular path point to the desired directions that form the typical asymmetric distributions.

The light extraction features do not all have to be the same. The main design feature is the angle β (in FIG. 10) that forms the normal of the light extraction feature. Not all the structures have to be tilted with the same angle β. This angle may change abruptly, gradually or according to any rule over the cross section of the arcuate surface in order to improve the uniformity of the illuminance on the ground.

FIG. 10 shows a cross section which decreases in thickness away from the light input end. This has an advantage that the lightguide is mounted at its stronger thicker end. However, other designs are possible.

FIG. 11 shows a design in which there is a variation to the acceptance angles of the light extraction features 100, so that the light extraction feature is collecting rays with angles from +α to −γ.

Rays with angles from +α to 0 hit on surface 105. Rays from 0 to −γ are those have been reflected by TIR on the vertical rear surface and after that hit the surface 105. Rays from 0 to −γ have a virtual source coming from outside the lightguide as represented in the FIG. 11.

In the design of FIG. 11, the lightguide again has decreasing thickness from the top. The reflecting facet presents an increase in thickness (slope 110) followed by the reflecting face 105 which tapers inwardly as in the example of FIG. 10.

FIG. 12 shows an example in which the lightguide increases in thickness away from the top light input end, using the double stepped light extraction features similar to those shown in FIG. 11.

FIG. 13 shows an example in which the lightguide has constant thickness, again using the double stepped light extraction features similar to those shown in FIG. 11.

The design is thus versatile.

The light extraction features do not all need to be the same size. The size of the extraction features may change in dependence on the distance from the light input end. The spacing may optionally also vary over the length of the lightguide. The light extraction features may for example be designed with a geometric progression of dimensions.

The collimator design may also be tailored to specific designs, so that the beam entering the lightguide can be tailored to meet the desired optical input for the light extraction features.

In some designs, there is a constant cross sectional shape, allowing manufacture using extrusion.

Figure 14:
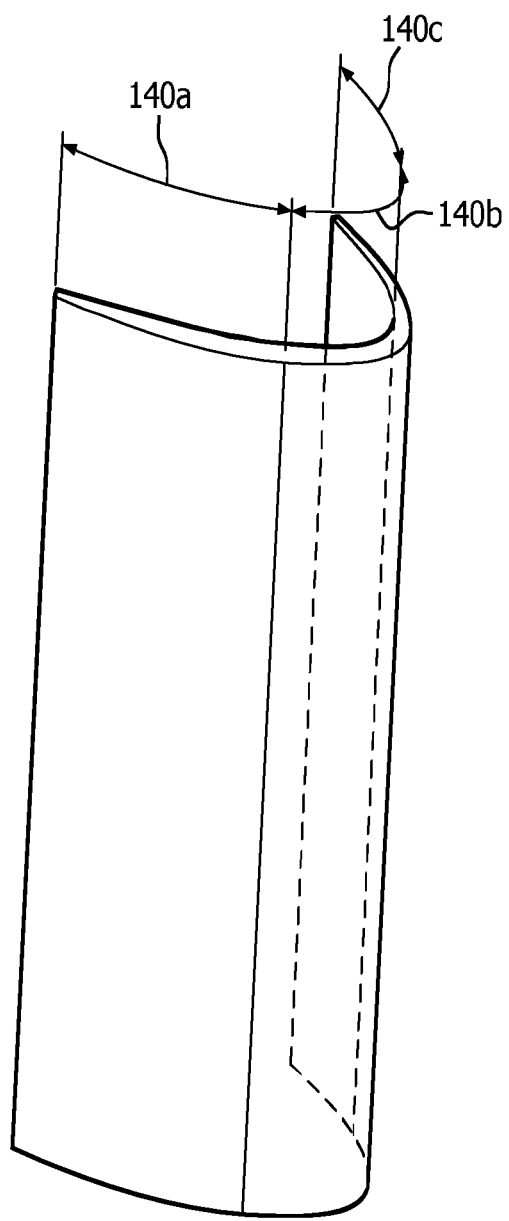
FIG. 14 shows a second example of the complete lighting system.

FIG. 14 shows a variation in which there are three sections 140a, 140b, 140c. Each section covers the full length and they are joined side to side, wherein each section has its own cross sectional shape. In each section, the angles β of the extraction features can be different, but at least β is different for two sections. The transition between each part of the guide can be sharp (for example by joining extruded sections together) or smooth (for example by molding the combined design). The transition extends over a small or large angle (a large angle giving a more gradual transition from one cross-section to the next). This is one of the design parameters for the device.

Due to the fact that many desired asymmetric distributions have a left-to-right symmetry the sections of the lightguide may also be symmetrical according this arrangement. For example, in FIG. 14, the sections 140a and 140c may be the same, and the section 140b in the center is different. This can be used to improve uniformity of the illuminance on the ground and to further tune the width of the light distribution.

Instead of providing transitions between sections, the variations in light extraction feature may comprise a smooth transition all along the arcuate shape, so that it is not possible to distinguish different segments or parts of the lightguide. The aim is again to improve uniformity of the illuminance on the ground and to further tune the width of the light distribution.

The LEDs may be uniformly spaced, but instead there may be variations in LED pitch. This can have the advantage that more LEDs can be located in a part where the most light is required and it may have the advantage that on more critical locations the overlap of the in-coupling collimators is less, which helps to reduce the generation of backward directed light.

The invention is of interest for example for outdoor luminaires in applications where appearance is important. The luminaires may for example be for the tops of lamp posts, or they may be pendant luminaires, for urban areas. The luminaires may instead be used for bollard lighting.

The invention can also be used for indoor or outdoor areas and may for example be used for indoor luminaires such as wall luminaires, for example giving functional lighting in corridors.

Other variations to the disclosed embodiments can be understood and effected by those skilled in the art in practicing the claimed invention, from a study of the drawings, the disclosure, and the appended claims. In the claims, the word "comprising" does not exclude other elements or steps, and the indefinite article "a" or "an" does not exclude a plurality. The mere fact that certain measures are recited in mutually different dependent claims does not indicate that a combination of these measures cannot be used to advantage. Any reference signs in the claims should not be construed as limiting the scope.

The invention claimed is:

1. A lighting system, comprising:
   an array of LEDs;
   a collimators arrangement mounted over the array of LEDs for collimating the light output from the LEDs;
   a lightguide mounted over the collimators arrangement, the lightguide comprising:
   an elongate structure having a length direction with one light input end mounted over the collimator arrangement, wherein the general shape in cross section perpendicular to the length direction comprises a non-circular arc, and the array of LEDs follows a corresponding non-circular arc; and
   light extraction features extending widthwise parallel to the light input end for out-coupling light from an outer arcuate surface of the lightguide,
   wherein, in each light extraction feature, an angle β is the angle between a normal n of the light extraction feature and a normal to the length direction, wherein said angle β at least once is gradually or abruptly changed in a direction parallel to the light input end.

2. A system as claimed in claim 1, wherein the light extraction features are provided at an inner arcuate surface of the lightguide.

3. A system as claimed in claim 1, wherein the light extraction features comprise sloped facets.

4. A lighting system, comprising:
   an array of LEDs;
   a collimators arrangement mounted over the array of LEDs for collimating the light output from the LEDs;
   a lightguide mounted over the collimators arrangement, the lightguide comprising:
   an elongate structure having a length direction with one light input end mounted over the collimator arrangement, wherein the general shape in cross section perpendicular to the length direction comprises a non-circular arc, and the array of LEDs follows a corresponding non-circular arc; and
   light extraction features extending widthwise parallel to the light input end for out-coupling light from an outer arcuate surface of the lightguide,
   wherein, in each light extraction feature, an angle β is the angle between a normal n of the light extraction feature and a normal to the length direction, wherein said angle β at least once is gradually or abruptly changed over the cross section of the outer arcuate surface of the light guide, and
   wherein in the direction parallel to the light input end, the lightguide comprises a plurality of sections positioned side to side, and wherein β is the same within a respective section, but for at least two sections β is mutually different.

5. A system as claimed in claim 4, wherein each section of the lightguide has a respective same cross sectional shape in a plane parallel to the length direction and parallel to the normal direction to the outer surface.

6. A system as claimed in claim 4, wherein the plurality of sections comprises outer sections and a central section, wherein outer sections equidistantly arranged from the central section on either side thereof, are mirrorly arranged and their respective light extraction feature has the same angle β.

7. A system as claimed in claim 1, wherein the collimator arrangement comprises total internal reflection collimators having a lens portion and a reflector portion.

8. A system as claimed in claim 7, wherein the collimators are rotationally symmetric.

9. A system as claimed in claim 1, wherein the lightguide comprises a channel which defines an elongate lens surface of the collimator arrangement at the base of the channel.

10. A system as claimed in claim 9, wherein the collimator arrangement further comprises a reflector portion as tapered side walls.

11. A system as claimed in claim 1, wherein the lightguide has a decreasing thickness away from the light input end, with step decreases in thickness defined by the light extraction features.

12. A system as claimed in claim 1, wherein the lightguide has a constant thickness excluding the light extraction features, and the light extraction features comprise raised or sunken projections.

13. A system as claimed in claim 1, wherein the LEDs are arranged uniformly along their non-circular arc.

14. A system as claimed in claim 1, which has an asymmetric angular light output intensity distribution in a plane perpendicular to the length direction.

15. A system as claimed in claim 1, wherein the non-circular arc comprises an elliptic arc.

* * * * *